(12) United States Patent
Tan et al.

(10) Patent No.: US 12,524,954 B2
(45) Date of Patent: Jan. 13, 2026

(54) GENERATING 3D MODELS FROM A SINGLE IMAGE

(71) Applicant: ADOBE INC., San Jose, CA (US)

(72) Inventors: Hao Tan, Santa Clara, CA (US); Yicong Hong, Bruce (AU); Kai Zhang, Sunnyvale, CA (US); Jiuxiang Gu, Baltimore, MD (US); Sai Bi, San Jose, CA (US); Yang Zhou, Mountain View, CA (US); Difan Liu, San Jose, CA (US); Feng Liu, Beaverton, OR (US); Kalyan K. Sunkavalli, Saratoga, CA (US); Trung Huu Bui, San Jose, CA (US)

(73) Assignee: ADOBE INC., San Jose, CA (US)

( * ) Notice: Subject to any disclaimer, the term of this patent is extended or adjusted under 35 U.S.C. 154(b) by 201 days.

(21) Appl. No.: 18/460,747

(22) Filed: Sep. 5, 2023

(65) Prior Publication Data

US 2025/0078393 A1 Mar. 6, 2025

(51) Int. Cl.
*G06T 15/20* (2011.01)
*G06T 7/73* (2017.01)
*G06T 17/20* (2006.01)

(52) U.S. Cl.
CPC ............ *G06T 15/205* (2013.01); *G06T 7/73* (2017.01); *G06T 17/20* (2013.01); *G06T 2207/10016* (2013.01); *G06T 2207/20081* (2013.01); *G06T 2207/20084* (2013.01)

(58) Field of Classification Search
CPC ......... G06T 17/00; G06T 15/205; G06T 7/73; G06T 17/20; G06T 2207/20081; G06T 2207/10016; G06T 2207/20084

USPC ......................................................... 345/418
See application file for complete search history.

(56) References Cited

U.S. PATENT DOCUMENTS

| | | | |
|---|---|---|---|
| 12,008,738 B2* | 6/2024 | Garg | G06T 5/50 |
| 2024/0096074 A1* | 3/2024 | Okorn | G06N 3/0455 |
| 2024/0169479 A1* | 5/2024 | Wang | G06T 3/4053 |
| 2024/0404104 A1* | 12/2024 | Revaud | G06V 20/70 |
| 2025/0078393 A1* | 3/2025 | Tan | G06T 17/00 |
| 2025/0104349 A1* | 3/2025 | Bi | G06T 15/20 |
| 2025/0148633 A1* | 5/2025 | Yasarla | G06T 7/20 |

OTHER PUBLICATIONS

Nguyen-Phuoc T, Li C, Theis L, Richardt C, Yang YL. Hologan: Unsupervised learning of 3d representations from natural images. InProceedings of the IEEE/CVF international conference on computer vision 2019 (pp. 7588-7597).*

(Continued)

*Primary Examiner* — Phu K Nguyen
(74) *Attorney, Agent, or Firm* — F. CHAU & ASSOCIATES, LLC

(57) ABSTRACT

Systems and methods for generating a 3D model from a single input image are described. Embodiments are configured to obtain an input image and camera view information corresponding to the input image; encode the input image to obtain 2D features comprising a plurality of 2D tokens corresponding to patches of the input image; decode the 2D features based on the camera view information to obtain 3D features comprising a plurality of 3D tokens corresponding to regions of a 3D representation; and generate a 3D model of the input image based on the 3D features.

25 Claims, 10 Drawing Sheets

(56) References Cited

OTHER PUBLICATIONS

Hong Y, Zhang K, Gu J, Bi S, Zhou Y, Liu D, Liu F, Sunkavalli K, Bui T, Tan H. Lrm: Large reconstruction model for single image to 3d. arXiv preprint arXiv:2311.04400. Nov. 8, 2023.*

Devlin et al, "BERT: Pre-training of Deep Bidirectional Transformers for Language Understanding", arXiv preprint arXiv:1810.04805v2 [cs.CL] May 24, 2019, 16 pages.

Mildenhall et al, "NeRF: Representing Scenes as Neural Radiance Fields for View Synthesis", arXiv preprint arXiv:2003.08934v2 [cs.CV] Aug. 3, 2020, 25 pages.

Liu et al, "One-2-3-45: Any Single Image to 3D Mesh in 45 Seconds without Per-Shape Optimization", arXiv preprint arXiv:2306.16928v1 [cs.CV] Jun. 29, 2023, 19 pages.

Liu et al, "Zero-1-to-3: Zero-shot One Image to 3D Object", arXiv preprint arXiv:2303.11328v1 [cs.CV] Mar. 20, 2023, 13 pages.

Yu et al, "pixelNeRF: Neural Radiance Fields from One or Few Images", arXiv preprint arXiv:2012.02190v3 [cs.CV] May 30, 2021, 20 pages.

Jang et al, "CodeNeRF: Disentangled Neural Radiance Fields for Object Categories", arXiv preprint arXiv:2109.01750v1 [cs.GR] Sep. 3, 2021, 10 pages.

Shen et al, "GINA-3D: Learning to Generate Implicit Neural Assets in the Wild", arXiv preprint arXiv:2304.02163v1 [cs.CV] Apr. 4, 2023, 23 pages.

Wu et al., "Multiview Compressive Coding for 3D Reconstruction", arXiv preprint arXiv:2301.08247v1 [cs.CV] Jan. 19, 2023, 12 pages.

* cited by examiner

GENERATING 3D MODELS FROM A SINGLE IMAGE

BACKGROUND

The following relates generally to image processing, and more specifically to generating a 3D model from an input image. Image processing and computer vision focus on how machines can understand, interpret, and interact with visual data. Image processing algorithms range from simple tasks such as image enhancement and noise reduction, to more complex tasks such as object detection, face recognition, semantic segmentation, and image content generation. Image processing forms the foundation for computer vision, enabling machines to mimic human visual perception and interpret the world in a structured and meaningful way.

Image processing techniques can also be used to create other types of data from input images, such as model or mesh data. Computer vision offers a wide array of techniques and methodologies for deriving 3D shape data from images. The process often involves converting 2D image data into a 3D representation, a task that leverages both geometry and the way light interacts with objects. Techniques such as stereopsis, structure from motion, and photogrammetry use multiple images of a scene taken from different perspectives to infer depth and reconstruct the 3D structure of a scene. However, these techniques rely on multiple coherent input images to produce a single 3D model.

SUMMARY

Systems and methods for generating a three-dimensional (3D) model from a single input image are described. Embodiments include a machine learning model configured to encode an input image to extract two-dimensional (2D) image features. In some embodiments, the 2D image features are combined with camera features and position features, and this combination is input to a feature decoder of the machine learning model to generate 3D features. The 3D features are then processed by a 3D model generator of the machine learning model to create a 3D model. According to some aspects, the 3D model is a neural radiance field (NeRF) representation of an object from the input image.

A method, apparatus, non-transitory computer readable medium, and system for generating a 3D model from an input image are described. One or more aspects of the method, apparatus, non-transitory computer readable medium, and system include obtaining an input image and camera view information corresponding to the input image; encoding the input image to obtain 2D features comprising a plurality of 2D tokens corresponding to patches of the input image; decoding the 2D features based on the camera view information to obtain 3D features comprising a plurality of 3D tokens corresponding to regions of a 3D representation; and generating a 3D model of the input image based on the 3D features.

A method, apparatus, non-transitory computer readable medium, and system for generating a 3D model from an input image are described. One or more aspects of the method, apparatus, non-transitory computer readable medium, and system include initializing a machine learning model; obtaining training data including a plurality of views of an object and view information corresponding to each of the plurality of views; and training the machine learning model to encode an input image to obtain 2D features, decode the 2D features to obtain 3D features based on camera view information, and generate an output image based on the 3D features using the training data.

An apparatus, system, and method for generating a 3D model from an input image are described. One or more aspects of the apparatus, system, and method include at least one processor; at least one memory including instructions executable by the at least one processor; and a machine learning model comprising parameters stored in the at least one memory and trained to encode an input image to obtain 2D features, decode the 2D features to obtain 3D features based on camera view information, and generate an output image based on the 3D features using the training data.

An apparatus, system, and method for deterministically generating a 3D model from an input image are described. The method includes obtaining an input image, wherein the input image comprises a 2D image; generating 3D features for the input image using a machine learning model, wherein the machine learning model comprises a deterministic transformer model; and generating a 3D model of the input image based on the 3D features.

DETAILED DESCRIPTION

Figure 1:
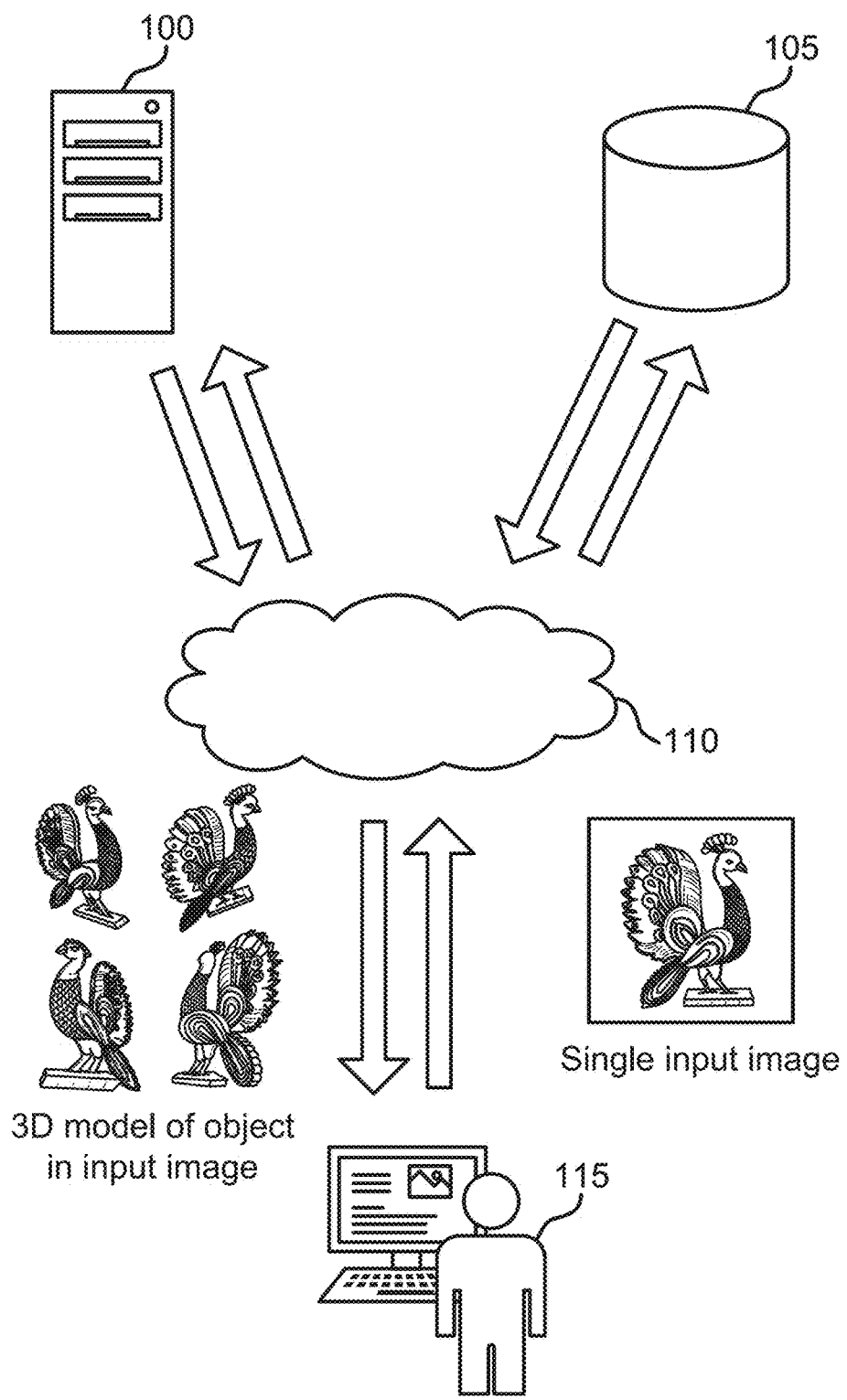
FIG. 1 shows an example of a 3D modeling system according to aspects of the present disclosure.

Image processing and computer vision are used to transform visual data into machine-interpretable formats, and enable machines to understand and interact with their environment visually. Image processing ranges from tasks like noise reduction, image enhancement, and color correction, to more intricate tasks that mimic human visual perception. Tasks such as object recognition, semantic segmentation, and scene understanding lie at the intersection of image processing and computer vision, demonstrating how machines can convert raw visual information into meaningful constructs.

Extracting shape data from images has been a central focus in computer vision. Conventional techniques like stereopsis, structure from motion, and photogrammetry utilize geometry and infer depth information and reconstruct the 3D structure of scenes. However, these techniques rely on the availability of multiple images of the same object from varying perspectives within the same scene, i.e., the coherence and consistency of the input images. These techniques may also rely on metadata, such as ground-truth camera pose information, to accurately interpret the scene's structure.

Other conventional techniques include systems for generating a shape from a single input image of a specific object category. For example, some systems include a diffusion models to enable multi-view supervision learning for models to generate new instances of an object within an object category, such as cars, buildings, or furniture. However, these models do not use the transformer architecture, are carefully tuned to base the generation on prior embedding(s) specific to the category, and cannot generalize to other domains without significant retraining.

In contrast, embodiments of the present disclosure include a 3D modeling apparatus configured to generate 3D models in any domain using a single input image. The 3D modeling apparatus includes a machine learning model that processes a 2D image to generate 3D shape data. The architecture of the machine learning model is a transformer-based autoencoder that bridges the gap between the 2D images and the 3D models as separate modalities by grounding the image to a feature-based 3D representation. In some embodiments, the 3D representation is a triplane representation, which will be described in detail later. Embodiments of the machine learning model are trained end-to-end with training data including 3D shapes and 2D reference views of the 3D shapes. According to some aspects, the 3D modeling apparatus is configured to infer view (e.g., camera pose) information from the input image.

A 3D modeling system configured to generate a 3D model from a single input image is described with reference to FIGS. 1-5. Methods for generating 3D models from an input image are described with reference to FIGS. 6-7. Training methods are described with reference to FIGS. 8-9. A computing device configured to implement a 3D modeling apparatus are described with reference to FIG. 10.

3D Modeling System

An apparatus for generating a 3D model from an input image is described. One or more aspects of the apparatus include at least one processor; at least one memory including instructions executable by the at least one processor; and a machine learning model comprising parameters stored in the at least one memory and trained to encode an input image to obtain 2D features, decode the 2D features to obtain 3D features based on camera view information, and generate an output image based on the 3D features using the training data.

In some aspects, the machine learning model comprises an image encoder, a feature decoder, a 3D model generator, and an image rendering component. Some embodiments of the image encoder comprise a transformer with a self-attention layer. Some embodiments of the feature decoder comprise a transformer model with a cross-attention layer and a self-attention layer.

In some aspects, the 3D model generator comprises a neural radiance field (NeRF) generator. Some examples of the apparatus, system, and method further include storing positioning features in the at least one memory. The positioning features may include tokens in a 3D representation space, such as a triplane representation.

FIG. 1 shows an example of a 3D modeling system according to aspects of the present disclosure. The example shown includes 3D modeling apparatus 100, database 105, network 110, and user 115.

In an example, user 115 selects an input image via a user interface. For example, the user can upload their own image, select an existing image, generate an image using a generative model, etc. Then, 3D modeling apparatus 100 processes the image to generate a 3D model of an object in the input image. For example, the 3D modeling apparatus 100 may use a machine learning model to extract 2D features from the input image, generate 3D features therefrom, and process the 3D features to create a 3D model such as a neural radiance field (NeRF). In this example, the 3D modeling apparatus 100 captures several different views of the 3D model and returns it to user 115. The system may also provide user 115 with the 3D model in the form of a downloadable mesh file, for example.

Embodiments of the 3D modeling apparatus 100 are implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a super computer, or any other suitable processing apparatus.

According to some aspects, 3D modeling apparatus 100 obtains an input image and camera view information corresponding to the input image. In some examples, the camera view information is stored in a memory accessible by 3D modeling apparatus 100 as default or learned camera view information.

According to some aspects, 3D modeling apparatus 100 initializes a machine learning model. The initialization may include initializing layers and structures similar to the architecture schematically depicted by FIG. 3. In some examples, 3D modeling apparatus 100 obtains training data including a set of views of an object and view information corresponding to each of the set of views. In some aspects, the training data further includes a set of videos, and where each video includes a set of frames depicting a real-world object. 3D modeling apparatus 100 is an example of, or includes aspects of, the corresponding element described with reference to FIG. 2.

Database 105 stores information used by the 3D modeling system such as machine learning model parameters, training data, shape data, configuration settings, and the like. A database is an organized collection of data. For example, a database stores data in a specified format known as a schema. A database may be structured as a single database, a distributed database, multiple distributed databases, or an emergency backup database. In some cases, a database 105 controller may manage data storage and processing in a database. In some cases, user 115 interacts with a database controller. In other cases, a database controller may operate automatically without user interaction.

Network 110 facilitates the transfer of information between 3D modeling apparatus 100, database 105, and user 115. Network 110 may be referred to as a "cloud". A cloud is a computer network configured to provide on-demand availability of computer system resources, such as data storage and computing power. In some examples, the cloud provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, a cloud is limited to a single organization. In other examples, the cloud is available to many organizations. In one example, a cloud includes a multi-layer communications network comprising multiple edge routers and core routers. In another example, a cloud is based on a local collection of switches in a single physical location.

Figure 2:
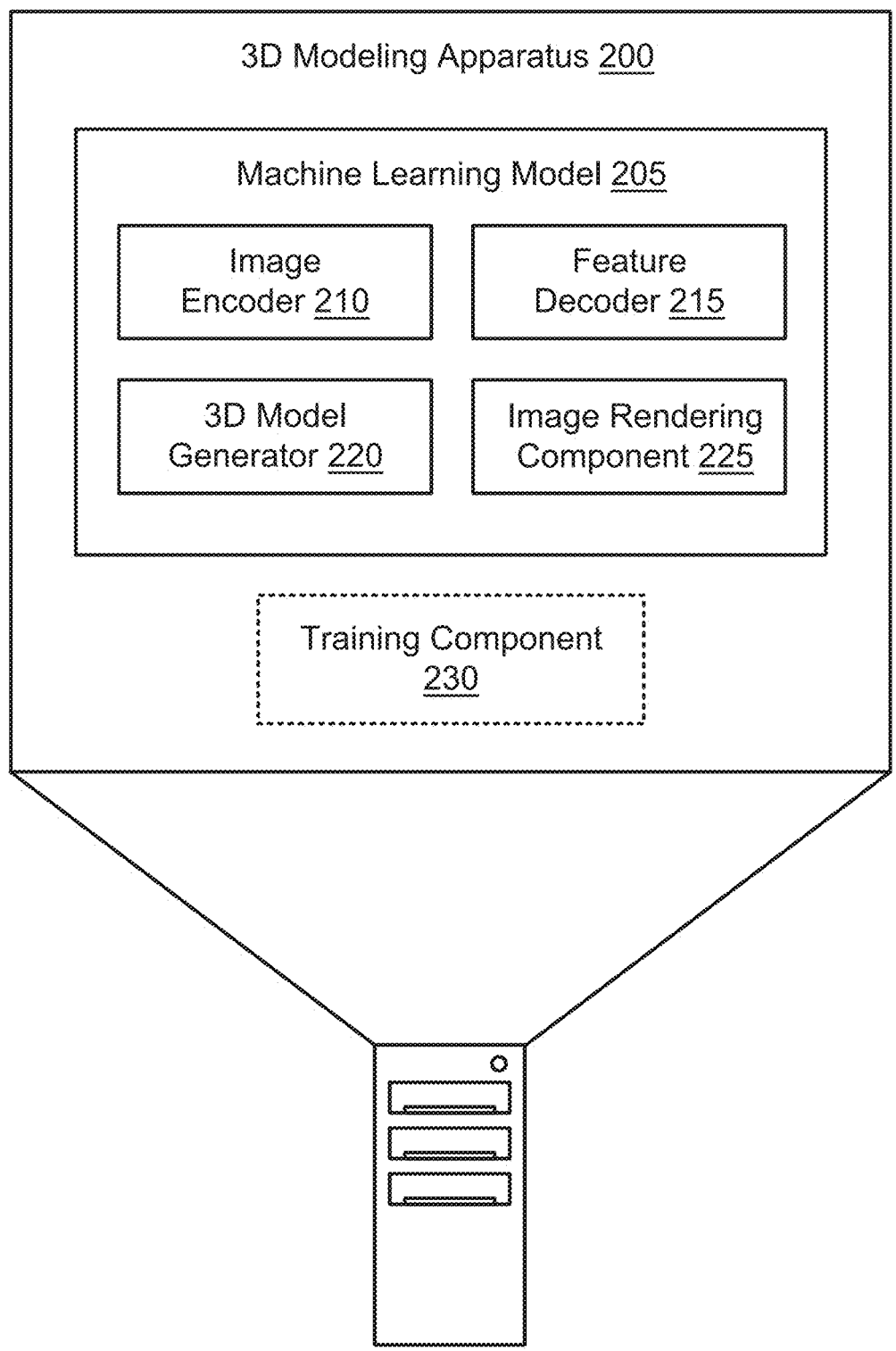
FIG. 2 shows an example of a 3D modeling apparatus according to aspects of the present disclosure.

FIG. 2 shows an example of a 3D modeling apparatus 200 according to aspects of the present disclosure. The example shown includes 3D modeling apparatus 200, machine learning model 205, and training component 230. FIG. 2 depicts a schematic overview of the components of 3D modeling apparatus 200.

According to some embodiments, the 3D modeling apparatus 200 may perform steps including obtaining an input image, wherein the input image comprises a 2D image; generating 3D features for the input image using a machine learning model, wherein the machine learning model comprises a deterministic transformer model; and generating a 3D model of the input image based on the 3D features.

Embodiments of 3D modeling apparatus 200 include several components and sub-components. These components are variously named, and are described so as to partition the functionality enabled by the processor(s) and the executable instructions included in the computing device used to implement 3D modeling apparatus 200 (such as the computing device described with reference to FIG. 10). The partitions may be implemented physically, such as through the use of separate circuits or processors for each component, or may be implemented logically via the architecture of the code executable by the processors.

Machine learning model 205 includes an artificial neural network (ANN). An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms (e.g., selecting the max from the inputs as the output) or any other suitable algorithm for activating the node. Each node and edge is associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

3D modeling apparatus 200 is an example of, or includes aspects of, the corresponding element described with reference to FIG. 1. Embodiments of machine learning model 205 include image encoder 210, feature decoder 215, 3D model generator 220, and image rendering component 225. According to some aspects, image encoder 210 and feature decoder 215 include a transformer network.

A transformer or transformer network is a type of neural network model used for sequence-to-sequence processing tasks. A transformer network transforms one sequence into another sequence using an encoder and a decoder. Encoder and decoder include modules that can be stacked on top of each other multiple times. The modules comprise multi-head attention and feed forward layers. Transformers have been traditionally used for natural language processing tasks, such as translation. The inputs and outputs (e.g., target sentences) are first embedded into an n-dimensional space. Positional encoding of the different words (i.e., give every word/part in a sequence a relative position since the sequence depends on the order of its elements) are added to the embedded representation (n-dimensional vector) of each word. In some examples, a transformer network includes an attention mechanism, where the attention looks at an input sequence and decides at each step which other parts of the sequence are important. The attention mechanism involves query, keys, and values denoted by Q, K, and V, respectively. Q is a matrix that contains the query (vector representation of one word in the sequence), K are all the keys (vector representations of all the words in the sequence) and V are the values, which are again the vector representations of all the words in the sequence. For the encoder and decoder, multi-head attention modules, V consists of the same word sequence than Q. However, for the attention module that is taking into account the encoder and the decoder sequences, V is different from the sequence represented by Q. In some cases, values in V are multiplied and summed with some attention-weights a.

Rather than performing translation between two languages, embodiments of the machine learning model 205 instead use transformer architecture to translate between two modalities of an object: a 2D image of the object, and a 3D model of the object. The model learns to infer shapes of the object from the 2D image, including shape data represented directly by the 2D image, as well as occluded shape data from latent knowledge of the model (e.g., knowing that a vase is likely symmetrical front-to-back, whereas a penguin will not have an additional face on its backside).

Image encoder 210 is configured to encode a 2D image to generate 2D image features. In some cases, image encoder 210 processes a tensor including 2D image data directly (height, width, and color information). According to some aspects, image encoder 210 encodes the input image to obtain 2D features including a set of 2D tokens corresponding to patches of the input image. The patches may be, for example, 16×16 pixel portions of the image. In some aspects, the encoding of the input image includes encoding the patches of the input image individually to obtain a set of 2D input tokens, where the set of 2D tokens is generated based on the set of 2D input tokens. The patch encoding may be performed by the image encoder 210 or by a separate convolution layer. In some examples, image encoder 210 performs self-attention on the set of 2D input tokens, where the set of 2D tokens is generated based on the self-attention.

Image encoder 210 is an example of, or includes aspects of, the corresponding element described with reference to FIG. 3.

Feature decoder 215 is configured to generate 3D features from the 2D features produced by image encoder 210. In some examples, the machine learning model combines the 2D features with camera view information in the form of a camera features tensor. The camera view information may be default information. The default information may be learned during a training phase of the machine learning model 205. According to some aspects, feature decoder 215 decodes the 2D features based on the camera view information to obtain 3D features including a set of 3D tokens corresponding to regions of a 3D representation. In some aspects, the decoding includes performing cross-attention on the position features and the 2D features, where the 3D features are generated based on the cross-attention.

In some aspects, the feature decoder 215 includes a transformer model with a cross-attention layer and a self-attention layer. Feature decoder 215 is an example of, or includes aspects of, the corresponding element described with reference to FIG. 3. Additional detail regarding cross-attention and self-attention will be provided with reference to FIG. 4.

3D model generator 220 is configured to generate a 3D model of the input image based on the 3D features. In some aspects, 3D model generator 220 includes a neural radiance field (NeRF) generator including a multi-layer perceptron (MLP) network configured to predict color (RGB) and density based on the 3D features. For example, the MLP may predict the color and density for a given point in a 3D space based on one or more 3D features corresponding to that point. In some aspects, the 3D model includes a neural radiance field (NeRF). 3D model generator 220 is an example of, or includes aspects of, the corresponding element described with reference to FIG. 3.

Image rendering component 225 is configured to generate an output image based on the 3D model. In some examples, the output image depicts elements of the input image from a different camera view than the camera view of the input image. According to some aspects, image rendering component 225 executes volumetric rendering techniques such as ray casting to generate the output image. For example, image rendering component 225 may determine the different camera view (e.g., sample a point and view direction from a sphere surrounding the 3D model), and then cast simulated rays toward the model from the simulated camera's position. The image rendering component 225 may then query the 3D model generator 220 along different positions in the ray to obtain color and density data. Then, the image rendering component 225 may aggregate the sampled information to form a final value for a pixel corresponding to the ray. The image rendering component 225 may repeat this process to determine the remaining pixels used to represent the different view. Image rendering component 225 is an example of, or includes aspects of, the corresponding element described with reference to FIG. 3.

Training component 230 is configured to update parameters of machine learning model 205 based on training data. In some embodiments, training component 230 updates machine learning model 205 end-to-end including image encoder 210, feature decoder 215, 3D model generator 220, and image rendering component 225 simultaneously during training. In some cases, training component 230 holds some parameters of machine learning model 205 during training while holding other parameters fixed. According to some aspects, training component 230 obtains position features corresponding to the regions of the 3D representation, where the 3D features are generated based on the position features. The position features may encode positional information that feature decoder 215 understands. For example, the position features may include a sequence of tokens that represent various regions in the 3D representation. The position features may be learned during a training process.

According to some aspects, training component 230 trains the machine learning model 205 to encode an input image to obtain 2D features, decode the 2D features to obtain 3D features based on camera view information, and generate an output image based on the 3D features using the training data. In some examples, training component 230 computes a pixel loss by comparing pixels of a predicted output image corresponding to a camera view and pixels of a ground-truth image corresponding to the camera view, where the training is based on the pixel loss. In some examples, training component 230 computes a perceptual loss by comparing features of a predicted output image corresponding to a camera view and features of a ground-truth image corresponding to the camera view, where the training is based on the perceptual loss. In some examples, training component 230 learns position features based on the training, where the machine learning model 205 is trained to generate the 3D features based on the position features. In at least one embodiment, training component 230 is implemented on an apparatus different than 3D modeling apparatus 200.

Figure 3:
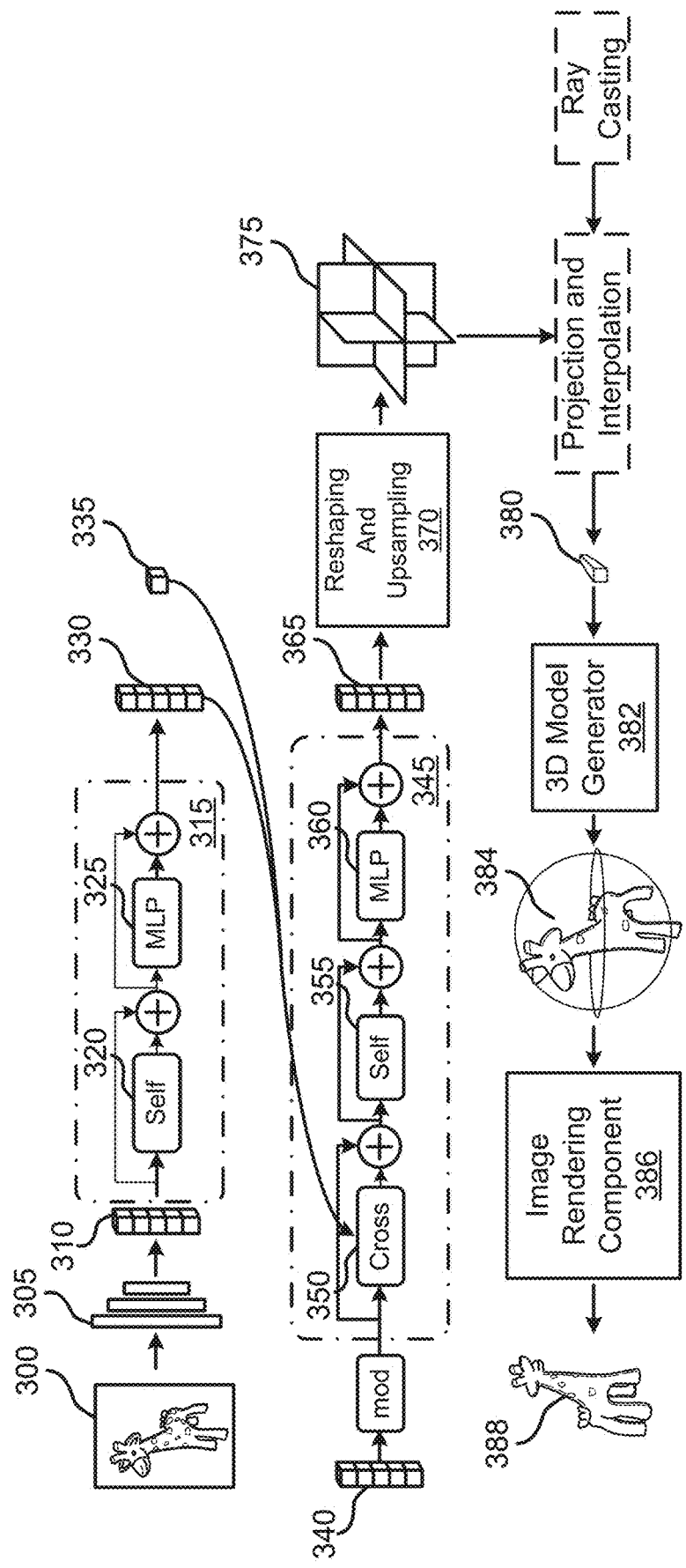
FIG. 3 shows an example of a pipeline for generating a 3D model according to aspects of the present disclosure.

FIG. 3 shows an example of a pipeline for generating a 3D model 382 according to aspects of the present disclosure. The example shown includes input image 300, convolution layer 305, image patch features 310, image encoder 315, 2D features 330, camera features 335, position features 340, feature decoder 345, 3D features 365, reshaping and upsampling 370, 3D representation 375, point features 380, 3D model generator 382, 3D model 384, image rendering component 386, and output image 388.

Image encoder 315, feature decoder 345, 3D model generator 380, and image rendering component 384 are examples of, or includes aspects of, the corresponding elements described with reference to FIG. 2. 2D features 330 is an example of, or includes aspects of, the corresponding element described with reference to FIG. 4. Position features 340 is an example of, or includes aspects of, the corresponding element described with reference to FIG. 4.

In one example, input image 300 is an RGB image depicting an object. The object may be a real life object (e.g., captured by an image sensor), or may be generated using a generative model. In some cases, input image 300 is input to convolution layer 305 to generate image patch features 310. Convolution layer 305 may process patches of the image (e.g., 12×12 pixel patches, or patches of a different size) using a trained convolutional neural network to produce the image patch features 310.

In one aspect, image encoder 315 includes first self-attention 320 and first MLP 325. Embodiments of image encoder 315 include a pre-trained visual transformer (ViT) network configure to encode input image 300 (or, in this example, image patch features 310) to generate 2D features 330. 2D features 330 may be or include a feature map denoted by $\{h_i\}_{i=1}^{n} \in \mathbb{R}^{h}$, where i is the i-th image patch, n is the total number of patch-wise features, and h is the latent dimension. In at least one embodiment, image encoder 315 includes or is based on the DINO pre-trained ViT encoder. "DINO" refers to the model's pretraining process including knowledge distillation ("DI") with no labels ("NO"). The DINO encoder generates features that emphasize the structure and texture of objects in an image, rather than semantic-oriented representations.

Embodiments then combine 2D features 330 with camera features 335. The camera features 335 represent a camera condition $c \in \mathbb{R}^{20}$. In some examples, the camera condition c is constructed by flattening out a 4×4 camera extrinsic matrix P and concatenating it with the camera focal length and principal point, e.g. $c=[P_{1\times 16}, f_x, f_y, c_x, c_y]$, where $c_x, c_y$ are the coordinates of the principal point. According to some aspects, the 3D modeling apparatus does not depend on a canonical pose of the object during inference, and the pose-accurate c is applied during training only to enable a multi-view reconstruction loss. For example, the 3D modeling apparatus may process only the input image without additional pose information, and may infer camera features 335 from the input image. In some embodiments, an additional MLP projects the camera condition $c \in \mathbb{R}^{20}$ to $\check{c} \in \mathbb{R}^d$, where d is a hidden dimension of feature decoder 345. In some cases, $\check{c}$ is used as camera features 335.

According to some aspects, the combination of 2D features 330 with camera features 335 is further combined with position features 340. Position features 340 include learnable tokens that are configured during the training of the machine learning model, and are then saved and used during inference. In some examples, position features 340 provide a basis in a 3D representation such as a triplane representation on which the system projects 2D features 330 from the input image 300. The position features 340 indicate 3D location information in the 3D representation. According to some aspects, the learnable tokens are denoted by f and are of dimension 3×(h×w)×d, where h and w are the spatial resolution. The learnable tokens f are initialized during training (e.g. position features 340) to carry the 3D information learned from training data, which is decoded along with 2D features 330 to yield 3D features 365. Hereafter, f will refer to the hidden embedding based on original position features 340 and updated through attention mechanisms.

In one aspect, feature decoder 345 includes cross-attention 350, second self-attention 355, and second MLP 360. The self-attention and cross-attention of image encoder 315 and feature decoder 345 will be described in greater detail with reference to FIG. 4.

Feature decoder 345 processes $\check{c}$ (e.g., camera features 335), $\{h_i\}_{i=1}^n$ (e.g., 2D features 330), and the initialized f (e.g. position features 340) to update f via modulation and cross-attention. According to some aspects, applying two different operations to f is used to capture the camera distortion inherent to input images, as well as to incorporate fine-grained geometric and color details from the image features. Embodiments apply $\check{c}$ to update f as described in the following equations:

$$\gamma, \beta = MLP^{MOD}(\check{c}) \quad (1)$$

$$f^{mod} = f \cdot (1+\gamma) + \beta \quad (2)$$

where γ and β are the scale and shift learned by $MLP^{MOD}$ (e.g., an additional MLP before cross-attention 350), and $f^{mod}$ is the modulated f.

In some examples, cross-attention 350 processes $f^{mod}$ as a query and $\{h_i\}_{i=1}^n$ (e.g., 2D features 330) as keys and values to embed image features onto a 3D representation space, such as a triplane representation. The output of cross-attention 350 is input to second self-attention 355 and to second MLP 360 to further model inter-modal relationships. In this way, embodiments of the machine learning model do not define an explicit spatial alignment between 2D and 3D features, but instead learn a 2D-to-3D grounding inherently during training. This grounding is used during inference in the attention-based decoding process as further described by the following equations:

$$f_j^{cross} = CrossAttn(f_j^{mod}; \{h_i\}_{i=1}^n) + f_j^{mod} \quad (3)$$

$$f_j^{self} = SelfAttn(f_j^{cross}; f_j^{cross}) + f_j^{cross} \quad (4)$$

$$f_j^{out} = MLP^{second}(f_j^{self}) + f_j^{self} \quad (5)$$

where the + sign indicates a residual connection. In this example, 3D features 365 is $f^{out}$. The j refers to the index of the 3D representation space.

Some embodiments additionally perform reshaping and upsampling 370 on 3D features 365 to map 3D features 365 to a specific 3D representation space, such as 3D representation 375 (referred to as the final triplane representation of the 3D features 365). 3D representation 375 may be a triplane representation. A triplane T is a compact form of feature representation. It includes three axis-aligned orthogonal feature planes $T_{XY}, T_{YZ}, T_{XZ}$. In some examples, each plane is of dimension $\mathbb{R}^{(H \times W) \times C}$, where H and W are the spatial resolution of the plane (e.g., a matrix of addressable feature points), and C is the number of feature channels per point. Any 3D point $P \in \mathbb{R}^3$ in the defined space can be accessed by querying the embedding at the corresponding spatial points of the plane to obtain point features ($p_{XY}, p_{YZ}, p_{XZ}$) via bilinear interpolation. The queried points are extracted as point features 380. The points may be queried along one or more rays passing through the planes.

3D model generator 382 receives point features point features 380 and generates 3D model 384. For example, 3D model generator 382 may include an MLP and predict a color RGB and a density σ for each of the point features 380. The 3D model 384 may be stored as a neural radiance field (NeRF), and the 3D model generator 382 may be a NeRF network configured to decode the 3D model 384 to produce the color RGB and the density σ. According to some aspects, the MLP of 3D model generator 382 includes K interleaved linear projection and rectified linear unit (ReLU) layers and can be expressed as $$p_{RGB}, p_\sigma = \{ReLU(Linear(\rho))\}_{k=1}^K \quad (6)$$

Image rendering component 386 employs volumetric rendering techniques to produce output image 388. For example, image rendering component 386 may cast simulated rays in the 3D model 384 from a simulated camera's position. The image rendering component 386 may then query the 3D model generator 382 along different positions in the ray to obtain color and density data. Then, the image rendering component 225 may aggregate the sampled information to form a final value for a pixel. The image rendering component 225 may repeat this process to determine the remaining pixels used to represent a view of the object.

Some embodiments additionally perform a mesh extraction to yield 3D shape data from the NeRF representation. In one example, the 3D modeling apparatus queries points from the 3D model 384, and then performs a marching cubes algorithm on the points to generate mesh data. In at least one embodiment, the 3D modeling apparatus queries 384×384×384 points, though the present disclosure is not limited thereto and different numbers of points may be queried to achieve a desired resolution.

Figure 4:
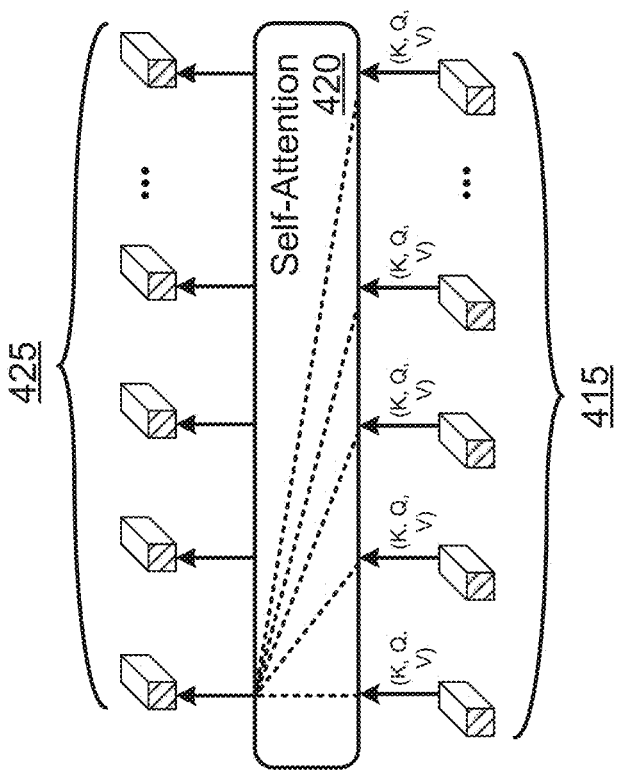
FIG. 4 shows an example of a feature decoder cross-attention and self-attention according to aspects of the present disclosure.
Figure 4:
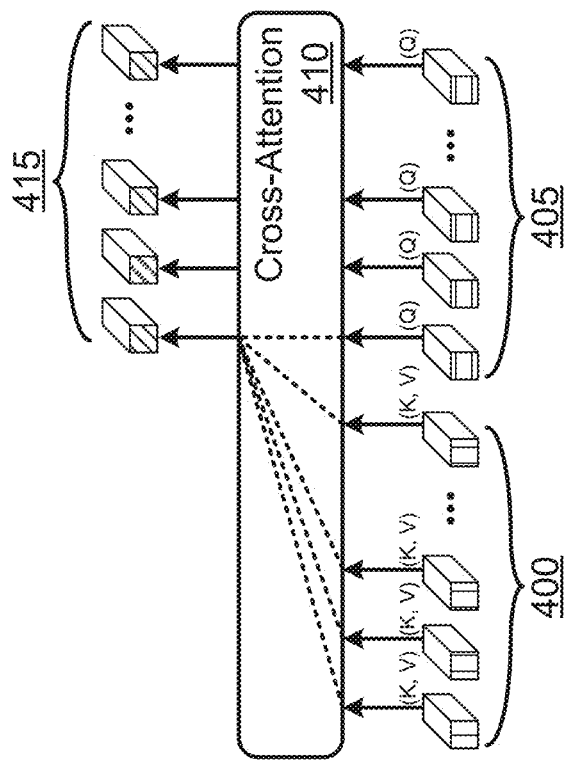

FIG. 4 shows an example of a feature decoder cross-attention 410 and self-attention 420 according to aspects of the present disclosure. The example shown includes 2D features 400, position features 405, cross-attention 410, first intermediate 3D features 415, self-attention 420, and second intermediate 3D features 425. 2D features 400, position features 405, and cross-attention 410 are an examples of, or include aspects of, the corresponding elements described with reference to FIG. 3.

In the example shown, cross-attention 410 combines 2D features 400 and position features 405 using 2D features 400 ($\{h_i\}_{i=1}^n$ with reference to FIG. 3) as the keys and values of the attention mechanism and position features 405 ($f_{mod}$ with reference to FIG. 3) as the queries. The cross-attention process yields first intermediate 3D features 415, which corresponds to $f_j^{cross}$ from Equation (3). Then, self-attention 420 performs a self-attention process on first intermediate 3D features 415 to yield second intermediate 3D features 425, corresponding to $f_j^{self}$ from Equation (4).

According to some aspects, the cross-attention 410 and self-attention 420 enable a machine learning model of the 3D modeling apparatus to learn a 2D-to-3D grounding during training, and to use the 2D-to-3D grounding during inference to "translate" between a 2D modality of an object and a 3D modality of an object. Embodiments thereby employ a data-driven approach (without domain specific customizations to the architecture design, or reliance on specific shape priors) that enable robust and generalizable generation of 3D shapes from a single input image.

Figure 5:
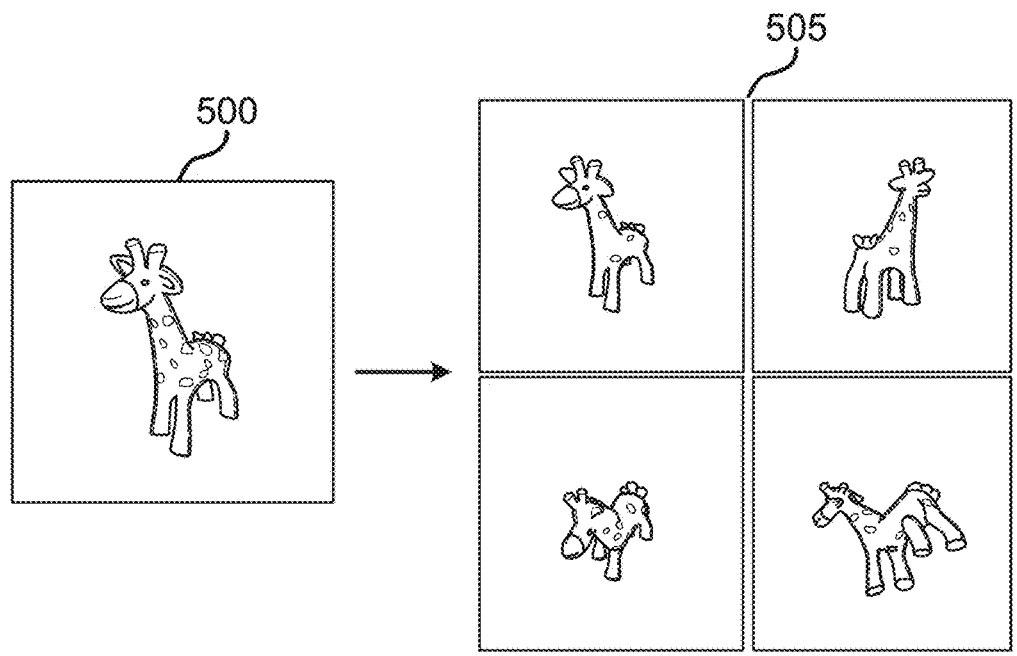
FIG. 5 shows an example of input images and and corresponding output images produced by the 3D modeling apparatus according to aspects of the present disclosure.
Figure 5:
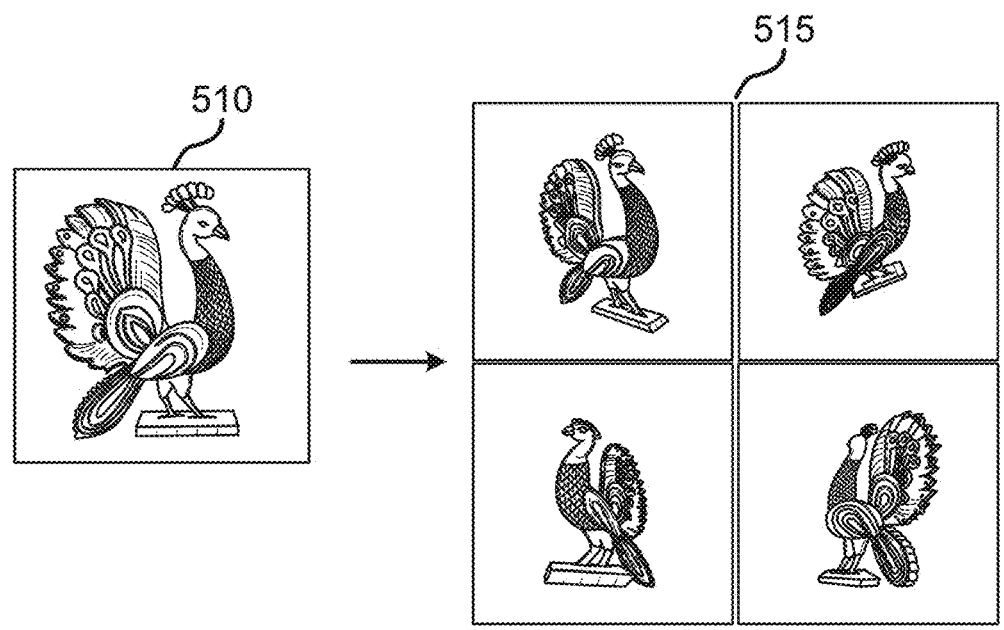

FIG. 5 shows an example of input images and corresponding output images produced by the 3D modeling apparatus according to aspects of the present disclosure. The example shown includes first input image 500, first output images 505, second input image 510, and second output images 515.

First input image 500 may be an image of a real-life object for which a user wishes to create 3D model data. For example, a user may take a photo of a stuffed giraffe toy, and then upload the photo through a user interface of the 3D modeling system. In some embodiments, the 3D modeling system performs segmentation (e.g., panoptic segmentation, semantic segmentation, or the like) to isolate the object and remove background image content. The image depicting the object without the background may be used as first input image 500. A 3D modeling apparatus such as the one described with reference to FIG. 2 may process first input image 500 to generate a 3D model of the object (e.g., giraffe), and produce first output images 505 depicting various views of the 3D model. For example, the 3D modeling apparatus may process the image according to the pipeline described with reference to FIG. 3.

Second input image 510 may be an image produced by a generative model such as DALL-E, StyleGAN, or stable diffusion models. For example, the user may prompt a generative model with the text "wooden peacock", and the generative model may produce second input image 510. The 3D modeling apparatus may similarly perform segmentation to remove any background image content. Then, the 3D modeling apparatus may process the second input image 510 to generate a 3D model of the wooden peacock, as well as second output images 515 depicting different views of the 3D model. In some embodiments, the 3D modeling apparatus also provides shape data to the user in the form of, for example, mesh data.

Generating 3D Models

A method for generating a 3D model from an input image is described. One or more aspects of the method include obtaining an input image and camera view information corresponding to the input image; encoding the input image to obtain 2D features comprising a plurality of 2D tokens corresponding to patches of the input image; decoding the 2D features based on the camera view information to obtain 3D features comprising a plurality of 3D tokens corresponding to regions of a 3D representation; and generating a 3D model of the input image based on the 3D features.

Some examples of the method, apparatus, non-transitory computer readable medium, and system further include generating an output image based on the 3D model, wherein the output image depicts elements of the input image from a different camera view. In some aspects, the 3D model comprises a neural radiance field (NeRF). In some aspects, the camera view information comprises default camera view information.

In some aspects, the encoding of the input image comprises encoding the patches of the input image individually to obtain a plurality of 2D input tokens, wherein the plurality of 2D tokens is generated based on the plurality of 2D input tokens. Some examples of the method, apparatus, non-transitory computer readable medium, and system further include performing self-attention on the plurality of 2D input tokens, wherein the plurality of 2D tokens is generated based on the self-attention.

Some examples of the method, apparatus, non-transitory computer readable medium, and system further include obtaining position features corresponding to the regions of the 3D representation, wherein the 3D features are generated based on the position features. In some aspects, the decoding comprises performing cross-attention on the position features and the 2D features, wherein the 3D features are generated based on the cross-attention. In some aspects, the 3D representation comprises a triplane representation.

In some embodiments, a method includes obtaining an input image, wherein the input image comprises a 2D image; generating 3D features for the input image using a machine learning model, wherein the machine learning model comprises a deterministic transformer model; and generating a 3D model of the input image based on the 3D features.

Figure 6:
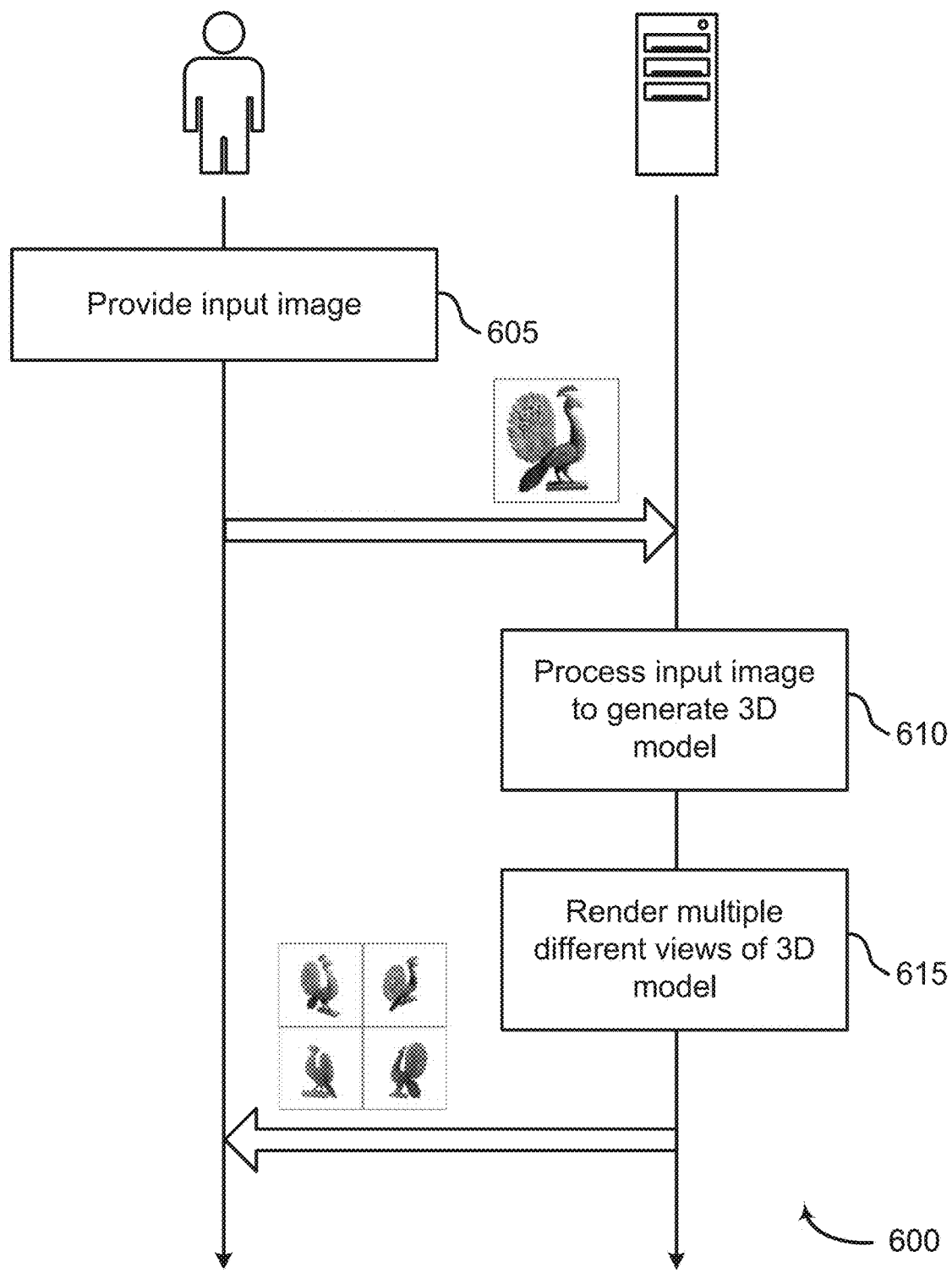
FIG. 6 shows an example of a method for providing different views of an object according to aspects of the present disclosure.

FIG. 6 shows an example of a method 600 for providing different views of an object according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, a user provides an input image. The user may provide the image via a user interface, for example, by uploading an image, selecting an image from a database, or providing a description of an image to a generative model.

At operation 610, the system processes the input image to generate a 3D model. The system may process the image according to the pipeline described with reference to FIG. 3. For example, the system may encode the input image using a machine learning model to generate 2D features, combine the 2D features with camera features, and further combine position features. This total combination may be fed to a feature decoder of a machine learning model to generate 3D features. The 3D features may be stored in, for example a triplane representation. Then the system may sample points along the triplane representation to yield point features, and generate a 3D model using the point features.

At operation 615, the system renders multiple different views of 3D model. The operations of this step may be performed by, for example, an image rendering component as described with reference to FIG. 3.

Figure 7:
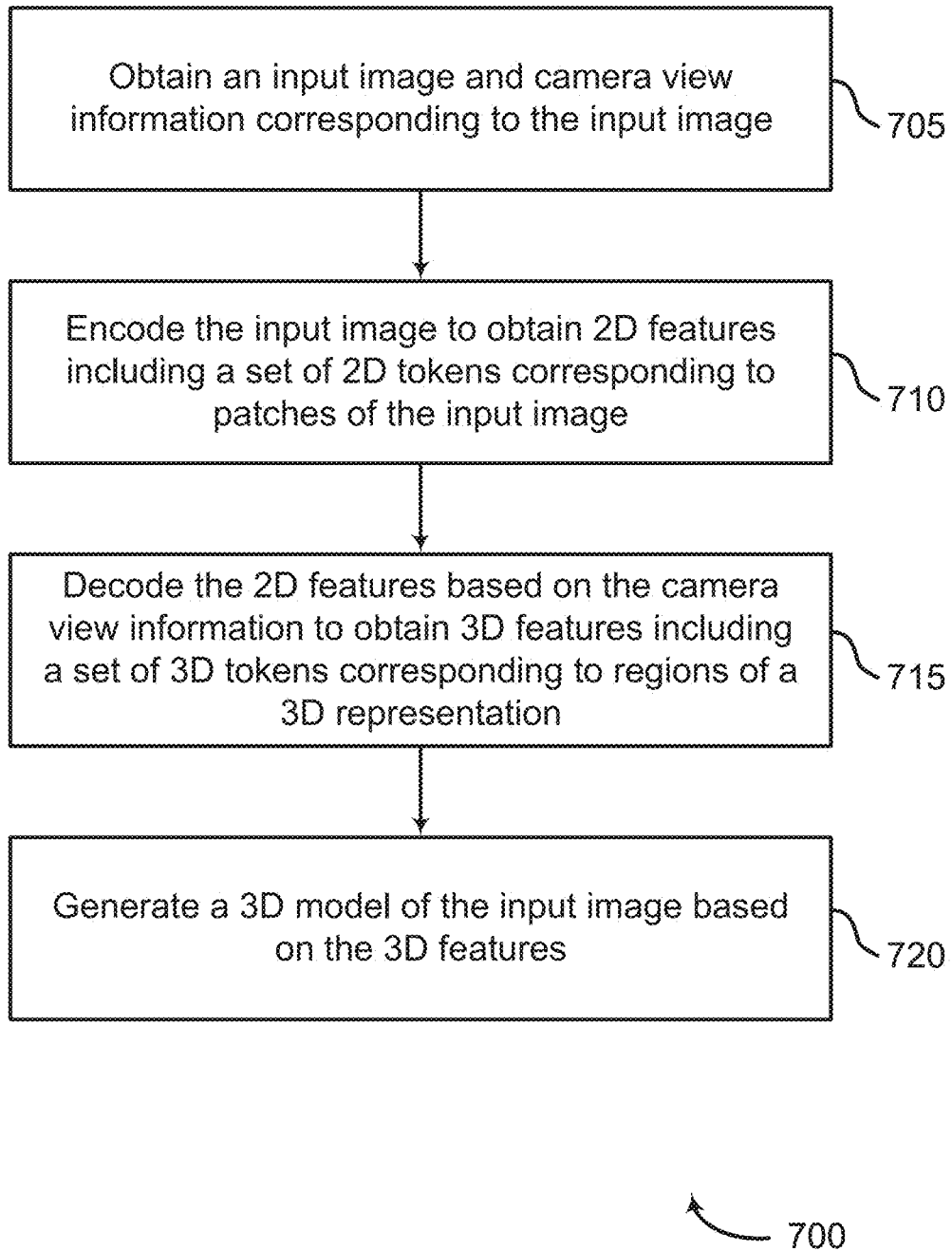
FIG. 7 shows an example of a method for generating a 3D model from a single input image according to aspects of the present disclosure.

FIG. 7 shows an example of a method 700 for generating a 3D model from a single input image according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system obtains an input image and camera view information corresponding to the input image. In some cases, the operations of this step refer to, or may be performed by, a 3D modeling apparatus as described with reference to FIGS. 1 and 2. A user may provide an image, and the system may initialize a default camera view, or use a machine learning model to determine camera view information based on the input image.

At operation 710, the system encodes the input image to obtain 2D features including a set of 2D tokens corresponding to patches of the input image. In some cases, the operations of this step refer to, or may be performed by, an image encoder of the machine learning model as described with reference to FIGS. 2 and 3. The image encoder may operate on the input image directly, or may operate on image patch features produced by a convolutional layer.

At operation 715, the system decodes the 2D features based on the camera view information to obtain 3D features including a set of 3D tokens corresponding to regions of a 3D representation. In some cases, the operations of this step refer to, or may be performed by, a feature decoder as described with reference to FIGS. 2 and 3. According to some aspects, the system incorporates the camera view information by appending camera features, and then combines this combination with position features to project the information from the 2D features onto a 3D basis.

At operation 720, the system generates a 3D model of the input image based on the 3D features. In some cases, the operations of this step refer to, or may be performed by, a 3D model generator as described with reference to FIGS. 2 and 3. The 3D model generator may include an MLP-based NeRF network, and be configured to generate the 3D model as a NeRF representation. In some cases, the system additionally outputs shape data or different views of an object from the input image.

Training

A method for generating a 3D model from an input image is described. One or more aspects of the method include initializing a machine learning model; obtaining training data including a plurality of views of an object and view information corresponding to each of the plurality of views; and training the machine learning model to encode an input image to obtain 2D features, decode the 2D features to obtain 3D features based on camera view information, and generate an output image based on the 3D features using the training data. Some examples of the method, apparatus, non-transitory computer readable medium, and system further include learning position features based on the training, wherein the machine learning model is trained to generate the 3D features based on the position features. In some aspects, the training data further includes a plurality of videos, and wherein each video includes a plurality of frames depicting a real-world object.

Some examples of the method, apparatus, non-transitory computer readable medium, and system further include computing a pixel loss by comparing pixels of a predicted output image corresponding to a camera view and pixels of a ground-truth image corresponding to the camera view, wherein the training is based on the pixel loss. Some examples further include computing a perceptual loss by comparing features of a predicted output image corresponding to a camera view and features of a ground-truth image corresponding to the camera view, wherein the training is based on the perceptual loss.

Figure 8:
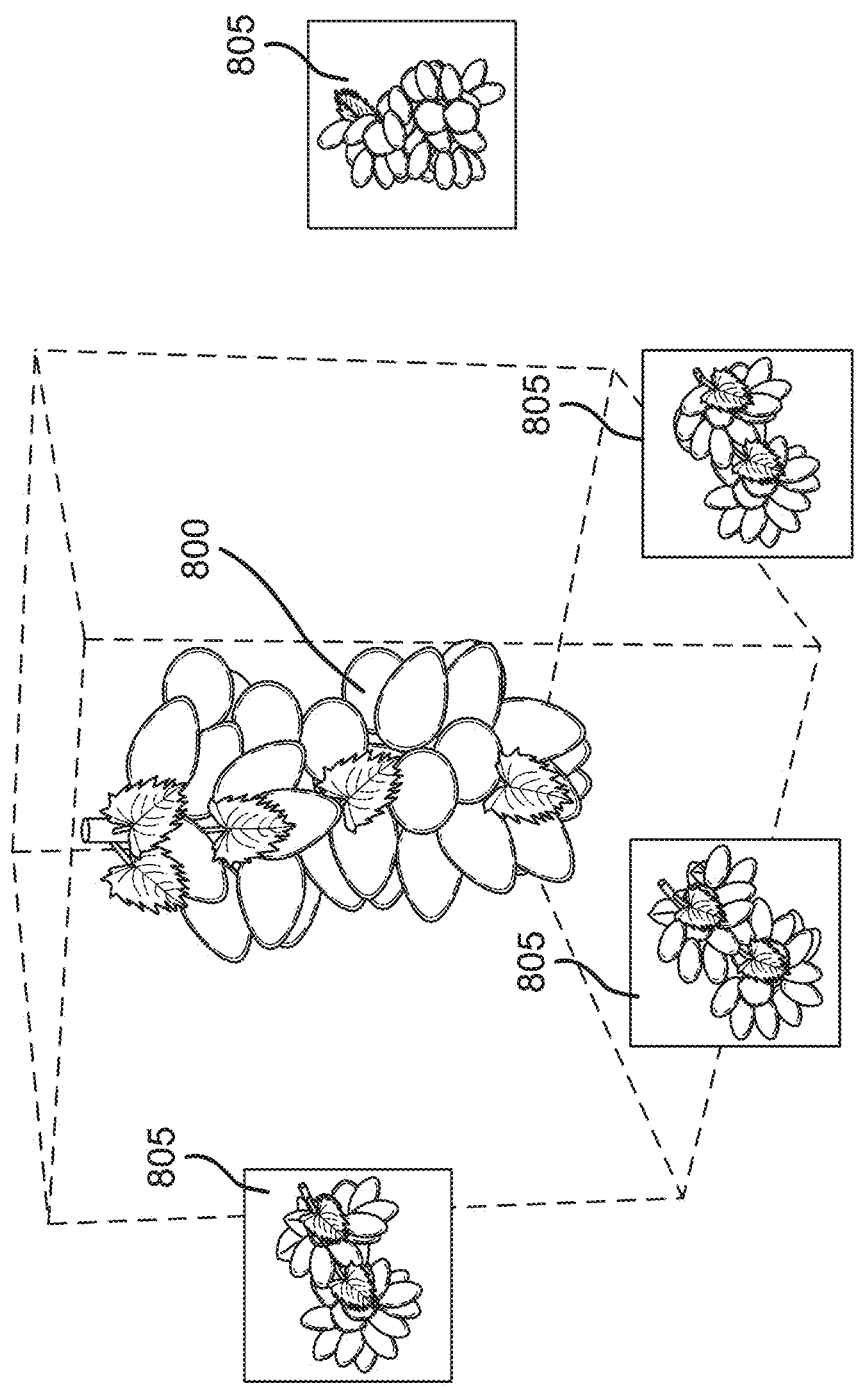
FIG. 8 shows an example of training data including a 3D model of an object and multiple views of the object according to aspects of the present disclosure.

FIG. 8 shows an example of training data including a 3D model of an object and multiple views of the object according to aspects of the present disclosure. The example shown includes ground-truth model 800 and ground-truth views 805.

Ground-truth model 800 may include a 3D model of a shape or object. The 3D model may, for example, be a NeRF representation of the object, or another type of model representation such as mesh data. Ground-truth views 805 include 2D images that represent different camera views of the object, and may further include camera pose information. For example, during training, a 3D modeling apparatus may input the camera pose information into the camera condition $c=[P_{1\times16}, f_x, f_y, c_x, c_y]$. According to some aspects, this enables the machine learning apparatus to generate camera features for an input image that accurately represent a pose of a simulated camera that "captured" the input image.

A training component as described with reference to FIG. 2 is configured to compute a loss function based on the differences between the machine learning model's predicted views, and the views depicted by ground-truth views 805. For example, in a training process, the machine learning model may process an image included in ground-truth views 805 as an input view. The machine learning model may predict a 3D model based on the input view, and then render multiple views of the 3D model corresponding to the remaining views from ground-truth views 805. The training component may compare the rendered views with the remaining ground-truth views 805, compute a loss function based on the comparison, and update parameters of the machine learning model based on the loss function.

In an example, ground-truth views 805 includes N side views in addition to the input view. The rendered views predicted by the machine learning model are denoted by $\hat{x}$ for an input image $x$, and the ground-truth 1+N views (including the input view) are denoted by $x^{GT}$. In one example, the training component computes a reconstruction loss including a pixel-based loss $\mathcal{L}_{MSE}$ and a feature-based loss $\mathcal{L}_{LPIPS}$:

$$\mathcal{L}_{recon}(x) = \sum_{i}^{N+1} \left( \mathcal{L}_{MSE}(\hat{x}_i, x_i^{GT}) \right) + \lambda \mathcal{L}_{LPIPS}(\hat{x}_i, x_i^{GT}) \tag{7}$$

where $\mathcal{L}_{MSE}$ is an L2 loss, and $\mathcal{L}_{LPIPS}$ is a perceptual image patch similarity loss, and $\lambda$ is a scaling coefficient. In at least one embodiment, the training component further computes a regularization loss $\mathcal{L}_{reg}$, which penalizes predicted pixel values beyond a particular range for each view.

Figure 9:
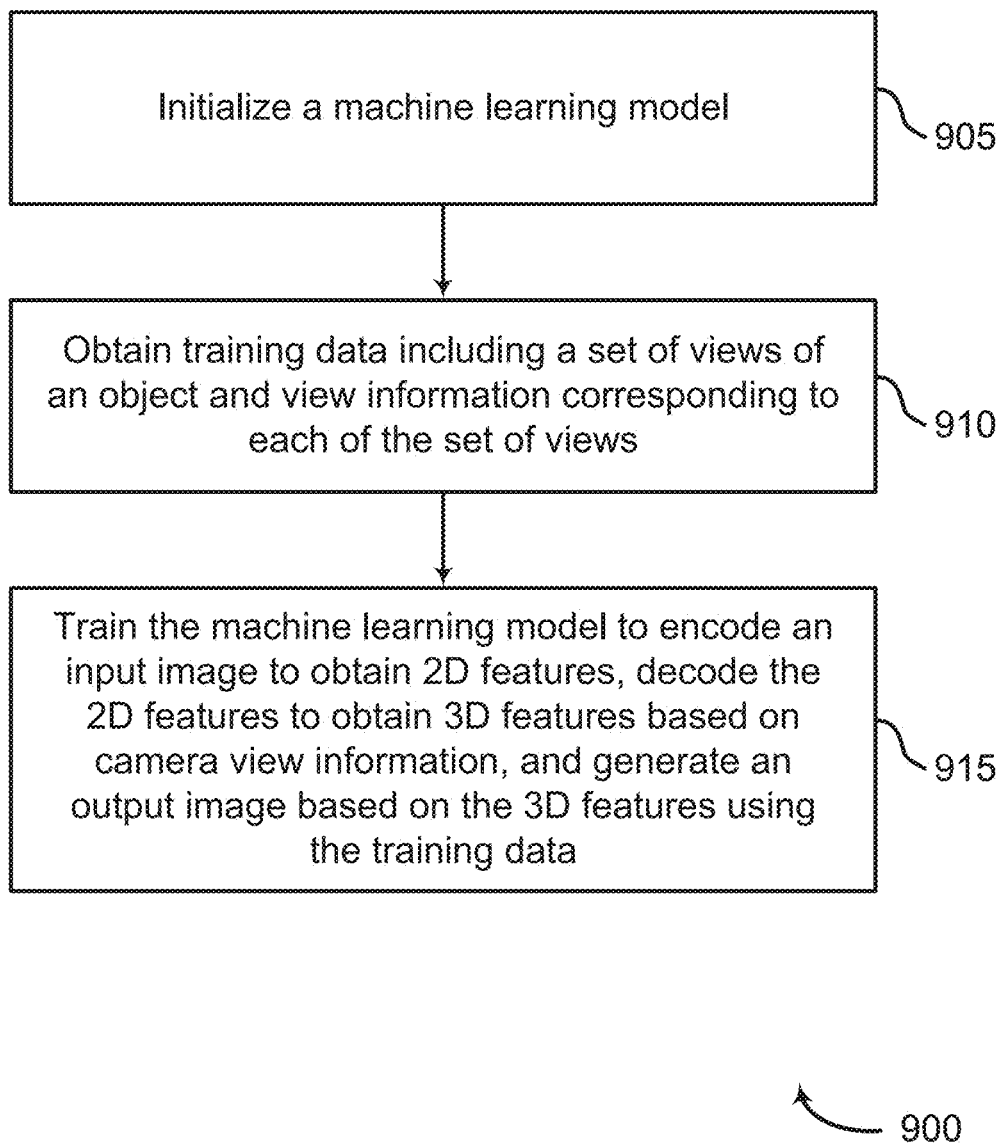
FIG. 9 shows an example of a method for training a machine learning model according to aspects of the present disclosure.

FIG. 9 shows an example of a method 900 for training a machine learning model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system initializes a machine learning model. In some cases, the operations of this step refer to, or may be performed by, a 3D modeling apparatus as described with reference to FIGS. 1 and 2. For example, the system may instantiate the ANN, activation function, convolutional layers, and other components used in the machine learning model with default or zero parameters.

At operation 910, the system obtains training data including a set of views of an object and view information corresponding to each of the set of views. In some cases, the operations of this step refer to, or may be performed by, a 3D modeling apparatus as described with reference to FIGS. 1 and 2. The training data may include ground-truth 3D model data, which may be represented as a NeRF or as a 3D mesh as described with reference to FIG. 8. According to some aspects, the training data further includes videos of objects. The videos may or may not include additional view information At operation 915, the system trains the machine learning model to encode an input image to obtain 2D features, decode the 2D features to obtain 3D features based on camera view information, and generate an output image based on the 3D features using the training data. In some cases, the operations of this step refer to, or may be performed by, a training component as described with reference to FIG. 2. For example, the system may process an input view from the training data to generate a 3D model of an object depicted by the input view, generate additional views based on the 3D model, and compare the generated views to views from the training data to compute a loss function as described with reference to FIG. 8 and Equation (7). The training component may then adjust parameters of a machine learning model of the system based on the loss function, using, for example, gradient descent.

Figure 10:
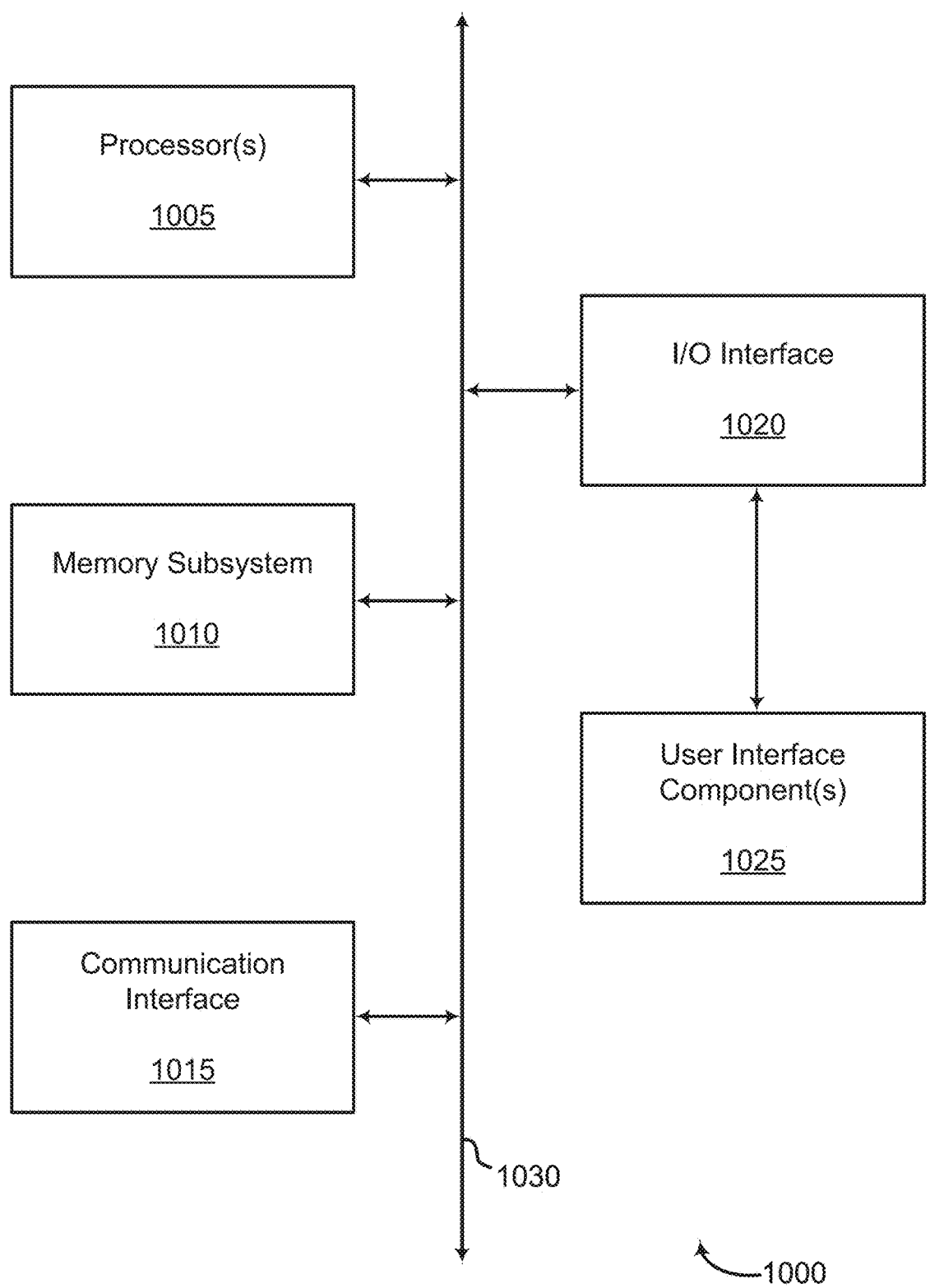
FIG. 10 shows an example of a computing device according to aspects of the present disclosure.

FIG. 10 shows an example of a computing device 1000 according to aspects of the present disclosure. The example shown includes computing device 1000, processor(s) 1005, memory subsystem 1010, communication interface 1015, I/O interface 1020, user interface component(s), and channel 1030.

In some embodiments, computing device 1000 is an example of, or includes aspects of, 3D modeling apparatus 100 of FIG. 1. In some embodiments, computing device 1000 includes one or more processors 1005 are configured to execute instructions stored in memory subsystem 1010 to obtain an input image and camera view information corresponding to the input image; encode the input image to obtain 2D features comprising a plurality of 2D tokens corresponding to patches of the input image; decode the 2D features based on the camera view information to obtain 3D features comprising a plurality of 3D tokens corresponding to regions of a 3D representation; and generate a 3D model of the input image based on the 3D features.

According to some aspects, computing device 1000 includes one or more processors 1005. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some aspects, memory subsystem 1010 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. The memory may store various parameters of machine learning models used in the components described with reference to FIG. 2. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1015 operates at a boundary between communicating entities (such as computing device 1000, one or more user devices, a cloud, and one or more databases) and channel 1030 and can record and process communications. In some cases, communication interface 1015 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1020 is controlled by an I/O controller to manage input and output signals for computing device 1000. In some cases, I/O interface 1020 manages peripherals not integrated into computing device 1000. In some cases, I/O interface 1020 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1020 or via hardware components controlled by the I/O controller.

According to some aspects, user interface component(s) 1025 enable a user to interact with computing device 1000. In some cases, user interface component(s) 1025 include an audio device, such as an external speaker system, an external display device such as a display screen, an input device (e.g., a remote control device interfaced with a user interface directly or through the I/O controller), or a combination thereof. In some cases, user interface component(s) 1025 include a GUI.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
obtaining an input image and camera view information corresponding to the input image;
encoding, using a machine learning model, the input image to obtain two-dimensional (2D) features comprising a plurality of 2D tokens corresponding to patches of the input image;
obtaining a plurality of three-dimensional (3D) position tokens, wherein each of the plurality of 3D position tokens is learned during training of the machine learning model to carry 3D information representing a region having a height and a width based on a spatial resolution;
decoding, using the machine learning model, the 2D features based on the camera view information and the plurality of 3D position tokens to obtain 3D features comprising a plurality of 3D tokens corresponding to the plurality of 3D position tokens, respectively; and
generating a 3D model of the input image based on the 3D features.

2. The method of claim 1, further comprising:
generating an output image based on the 3D model, wherein the output image depicts elements of the input image from a different camera view.

3. The method of claim 1, wherein:
the encoding of the input image comprises encoding the patches of the input image individually to obtain a plurality of 2D input tokens, wherein the plurality of 2D tokens is generated based on the plurality of 2D input tokens.

4. The method of claim 3, further comprising:
performing self-attention on the plurality of 2D input tokens, wherein the plurality of 2D tokens is generated based on the self-attention.

5. The method of claim 1, further comprising:
modulating the plurality of 3D position tokens based on the camera view information.

6. The method of claim 1, wherein:
the decoding comprises performing cross-attention on the plurality of 3D position tokens and the 2D features, wherein the 3D features are generated based on the cross-attention.

7. The method of claim 1, wherein:
the 3D information representing the region comprises a triplane representation.

8. The method of claim 1, wherein:
the 3D model comprises a neural radiance field (NeRF).

9. The method of claim 1, wherein:
the camera view information comprises default camera view information.

10. A method comprising:
initializing a machine learning model;
obtaining training data including a plurality of views of an object and view information corresponding to each of the plurality of views; and training the machine learning model to:
　　encode an input image to obtain 2D features;
　　obtain a plurality of three-dimensional (3D) position tokens, wherein each of the plurality of 3D position tokens is learned during the training to carry 3D information representing a region having a height and a width based on a spatial resolution;
　　decode the 2D features to obtain 3D features based on camera view information and the plurality of 3D position tokens, wherein the 3D features comprise a plurality of 3D tokens corresponding to the plurality of 3D position tokens, respectively; and
　　generate an output image based on the 3D features using the training data.

11. The method of claim 10, further comprising:
computing a pixel loss by comparing pixels of a predicted output image corresponding to a camera view and pixels of a ground-truth image corresponding to the camera view, wherein the training is based on the pixel loss.

12. The method of claim 10, further comprising:
computing a perceptual loss by comparing features of a predicted output image corresponding to a camera view and features of a ground-truth image corresponding to the camera view, wherein the training is based on the perceptual loss.

13. The method of claim 10, wherein:
the training data further includes a plurality of videos, and wherein each video includes a plurality of frames depicting a real-world object.

14. The method of claim 10, further comprising:
learning the plurality of 3D position tokens during the training, wherein the machine learning model is trained to generate the 3D features based on the plurality of 3D position tokens.

15. An apparatus comprising:
at least one processor;
at least one memory including instructions executable by the at least one processor; and
the apparatus further comprising a machine learning model comprising parameters stored in the at least one memory and trained to:
　　encode an input image to obtain 2D features;
　　obtain a plurality of three-dimensional (3D) position tokens, wherein each of the plurality of 3D position tokens is learned during training of the machine learning model to carry 3D information representing a region having a height and a width based on a spatial resolution;
　　decode the 2D features to obtain 3D features based on camera view information and the plurality of 3D position tokens, wherein the 3D features comprise a plurality of 3D tokens corresponding to the plurality of 3D position tokens, respectively; and
　　generate an output image based on the 3D features using training data.

16. The apparatus of claim 15, wherein:
the machine learning model comprises an image encoder, a feature decoder, a 3D model generator, and an image rendering component.

17. The apparatus of claim 16, wherein:
the image encoder comprises a transformer with a self-attention layer.

18. The apparatus of claim 16, wherein:
the feature decoder comprises a transformer model with a cross-attention layer and a self-attention layer.

19. The apparatus of claim 16, wherein:
the 3D model generator comprises a neural radiance field (NeRF) generator.

20. The apparatus of claim 15, wherein:
the plurality of 3D position tokens is stored in the at least one memory.

21. A method comprising:
obtaining an input image, wherein the input image comprises a two-dimensional (2D) image;
encoding, using a machine learning model, the input image to obtain two-dimensional (2D) features comprising a plurality of 2D tokens corresponding to patches of the input image;
obtaining a plurality of three-dimensional (3D) position tokens, wherein each of the plurality of 3D position tokens is learned during training of the machine learning model to carry 3D information representing a region having a height and a width based on a spatial resolution;
generating three-dimensional (3D) features for the input image using a machine learning model based on camera view information and the plurality of 3D position tokens, wherein the machine learning model comprises a deterministic transformer model, and the 3D features comprise a plurality of 3D tokens corresponding to the plurality of 3D position tokens, respectively; and
generating a 3D model of the input image based on the 3D features.

22. The method of claim 21, wherein generating the 3D features comprises:
decoding the 2D features to obtain the 3D features.

23. The method of claim 21, wherein generating the 3D features comprises:
deterministically translating a sequence of 2D tokens corresponding to the input image into a sequence of 3D triplane tokens, wherein the 3D model is generated based on the sequence of 3D triplane tokens.

24. The method of claim 21, further comprising:
obtaining the camera view information for the input image, wherein the machine learning model takes the camera view information as input.

25. The method of claim 21, further comprising:
generating an additional 2D image based on the 3D model, wherein the additional 2D image depicts a scene of the input image from a different camera view.

* * * * *